United States Patent [19]

Reneau

[11] Patent Number: 5,711,450
[45] Date of Patent: Jan. 27, 1998

[54] DOOR FOR CLOSING AN OPENING IN A PRESSURE VESSEL

[76] Inventor: Raymond Paul Reneau, 701 N. St. Marys, San Antonio, Tex. 78205

[21] Appl. No.: 616,659

[22] Filed: Mar. 15, 1996

[51] Int. Cl.[6] ................................................. B65D 45/23
[52] U.S. Cl. ............................ 220/319; 220/323; 220/324
[58] Field of Search .................................. 220/319, 323, 220/324, 378, 233, 345

[56] References Cited

U.S. PATENT DOCUMENTS

| | | |
|---|---|---|
| D. 52,426 | 9/1918 | Blanchard . |
| D. 88,979 | 1/1933 | Mortrude, Jr. . |
| D. 208,744 | 9/1967 | Waine . |
| D. 258,084 | 1/1981 | Weingarten . |
| D. 346,864 | 5/1994 | Reneau . |
| 997,793 | 7/1911 | Fish et al. . |
| 1,269,572 | 6/1918 | Allenbaugh . |
| 2,010,200 | 8/1935 | Rufener et al. . |
| 2,196,895 | 4/1940 | Bowman . |
| 2,584,100 | 1/1952 | Uecker . |
| 2,664,611 | 1/1954 | Shomber . |
| 3,258,151 | 6/1966 | Gasche . |
| 3,866,794 | 2/1975 | Kerr . |
| 4,102,474 | 7/1978 | Platts . |
| 4,114,933 | 9/1978 | Jankelewitz . |
| 4,315,577 | 2/1982 | Bernson, Jr. . |
| 4,342,207 | 8/1982 | Holmes et al. . |
| 4,467,798 | 8/1984 | Saxon et al. . |
| 4,489,850 | 12/1984 | Reneau . |
| 4,512,496 | 4/1985 | Tsou . |
| 4,625,890 | 12/1986 | Galer . |
| 4,727,870 | 3/1988 | Krasle . |
| 4,817,610 | 4/1989 | Lee . |
| 5,402,775 | 4/1995 | Reneau . |
| 5,433,334 | 7/1995 | Reneau . |

FOREIGN PATENT DOCUMENTS

| | | |
|---|---|---|
| 1506931 | 11/1967 | France . |
| 1710041 | 2/1992 | Russian Federation . |
| 1681854 | 10/1991 | U.S.S.R. . |

OTHER PUBLICATIONS

"Sechrist Monoplace Hyperbaric Systems", by Sechrist Industries, Inc., undated.

"Offers Advantages No Other Hyperbaric Unit Can", by Proteus Hyperbaric Systems, Inc., 1983, pp. P000826–P000831.

"Can your hospital afford not to have the Reneau Unit's unique capabilities?", by Reneau, Inc., undated.

"Hyperbaric Chamber Systems & Management PROTEUS", by Proteus Hypberbaric Systems, Inc., 1995, pp. P000851–P000874.

"The Reneau Unit—The first single-patient hyperbaric unit designed for safe 'hands-on' access to the patient during treatment", by Reneau, Inc., 1983. (not enclosed).

"Sigma I Monoplace Hyperbaric System", by Perry Baromedical Services, undated. (not enclosed).

*Primary Examiner*—Joseph M. Moy
*Attorney, Agent, or Firm*—Vaden, Eickenroht & Thompson, L.L.P.

[57] ABSTRACT

There is disclosed a door for closing an access opening of a hyperbaric or other pressure chamber in which access may be had to the interior of a vessel in which a patient is received through an opening and which, when in closed position, is releasably locked to the vessel.

7 Claims, 2 Drawing Sheets

DOOR FOR CLOSING AN OPENING IN A PRESSURE VESSEL

This invention relates generally to a door for closing a pressure vessel such as a hyperbaric chamber in which a patient may be treated medically at pressures greater than normal. More particularly, it relates to improvements in doors of this type which may be released locked in its closed position.

As shown for example in U.S. Pat. No. 4,489,850, a door of this type for closing an access opening in one end of the cylinder of the vessel is releasably locked thereto by means of locking plates arranged about the periphery of the door. Thus, as shown, the locking plates are moved into and out of locking positions by means of a rotatable ring which may be manipulated from outside of the chamber. When in locking position, the plates are held in locking position by pressure within the vessel. Upon relief of the pressure, the plates may be moved to unlocked position to permit the door to be opened.

More particularly, the locking plates and ring are carried about the outer periphery of the door, and the ring is rotated in one direction about the body of the door in order to move the outer ends of the plates into positions opposite an inwardly facing bearing surface within a groove in the inner periphery of the open end of the vessel, and in the other direction to move them out of engagement with the bearing surface.

The end edges of the plates are confined on opposite sides by end surfaces of the door over which they must slide as they are moved guidably into and out of locking position by means of pins on the ring slidable within slots in the locking plates. These require very close tolerances between the sliding surfaces which, if not maintained, may cause the parts to bind and thus interfere with opening and closing of door and/or damage to the parts.

The object of this invention is to provide a door of the type above described which is releasably locked in closed position in such a manner as to overcome these and other problems; and, more particularly, in which the door is releasably locked and unlocked by means of locking elements which are swung between locking and unlocking positions while eliminating non-linearities that require different angles and unique geometry.

This and other objects are accomplished, in accordance with the illustrated embodiments of the invention, by a door of the type above described having an outer surface adapted to fit within an opening in one end of a vessel of the chamber, as well as means for releasably locking the door in closed position when so fitted. More particularly, the locking means comprises locking elements each mounted on the door for pivoting between locked position in which one side of each is opposite an inwardly facing bearing surface on the vessel, and thus held thereagainst by pressure in the vessel, and unlocked position removed from opposite said bearing surface so as to permit the door to be installed and/or removed from within the inner surface of the opening in the vessel. A ring is rotatably mounted on the door for moving the locking elements between locked and unlocked positions in response to rotation of the ring in opposite directions, and means are provided for so rotating the ring upon manipulation from the outside of the vessel. Thus, as will be understood, this door construction overcomes the above-described prior door in that the locking elements are moved by essentially circumferential rather than radial forces and thus eliminating such non-linearities.

In the illustrated embodiment of the invention, the rotating means comprises pins mounted on the door and so arranged with respect to oppositely facing surfaces of the locking elements as to swing the locking elements into locked position, as the ring is rotated in one direction, and into unlocked position, as the ring is rotated in the other direction. In one such embodiment, the pins are arranged in pairs on opposite sides of a locking element so that one pin of at least one pair engages one side of a locking element to swing it into locked position, as the ring is rotated in one direction, and the other pin engages the other side of the locking element to swing it into unlocked position, as the ring is rotated in the other direction. In one case, the pins of the one pair are tightly engaged with opposite sides of the locking element in each of its locked and unlocked positions to prevent movement of the locking elements therepast. In another case, one side of one pin of the one pair is tightly engaged with one side of the locking element in one of its locked and unlocked positions to prevent movement of the locking elements therepast, and each locking element has a shoulder adjacent its other side which is tightly engaged by the other pin, in the other of its positions, to prevent the locking elements from moving therepast.

In accordance with another embodiment of the invention, each locking element has a slot in which a pin on the ring is received for guidably sliding therein in order to swing the locking element into locked position, as the ring is rotated in one direction, and swing the locking element into unlocked position, as the ring is rotated in the other direction.

As shown, the door includes a body on which the ring is rotatably mounted, and each locking element has an end which is contoured to move past and then closely adjacent to a cylindrical surface on the vessel adjacent its bearing surface, as the locking element moves into locking position.

In the drawings, wherein like reference characters are used throughout to designate like parts:

Figure 1:
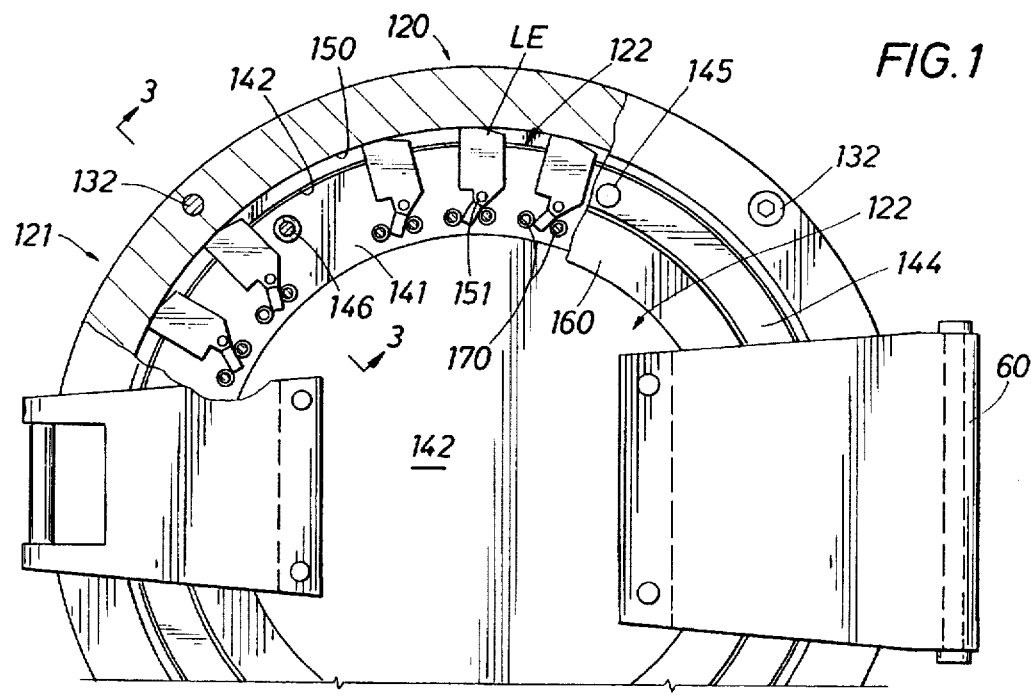
FIG. 1 is an enlarged end view of a portion of a hyperbaric chamber and a door for closing an opening therein which is constructed in accordance with an illustrative embodiment of the invention, and with a portion of the door and vessel of the chamber broken away to show the locking elements swung into locking position within a groove in the vessel.
Figure 3:
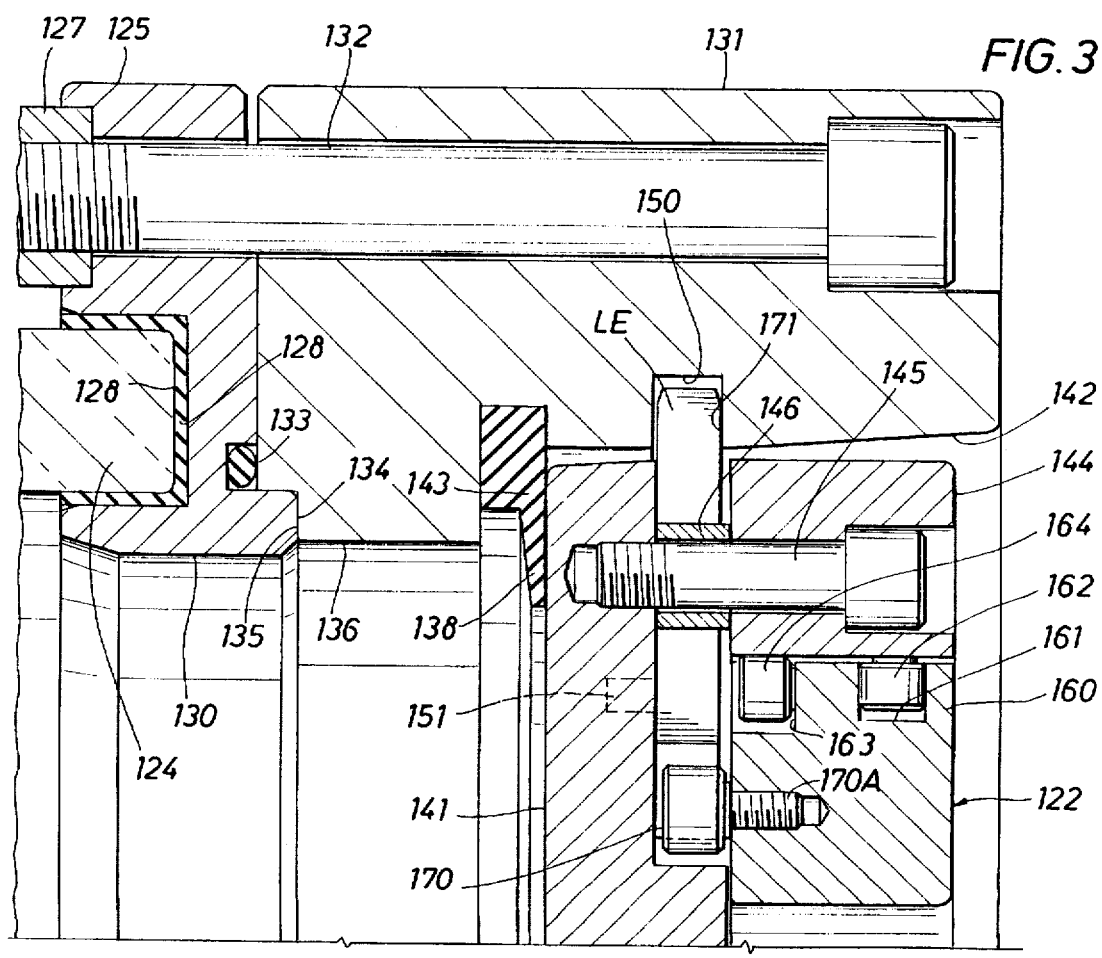
FIG. 3 is a further enlarged longitudinal sectional view of the left end of the vessel, as seen along broken line 3—3 of FIG. 2, and showing a locking element in locked position.
Figure 2:
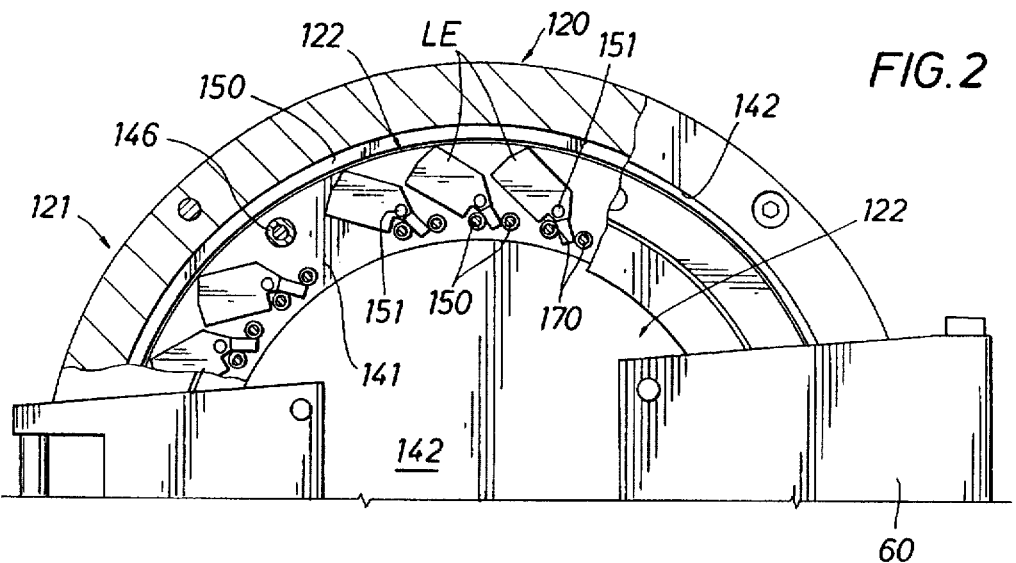
FIG. 2 is a view similar to FIG. 1 but wherein the ring has been rotated in a clockwise direction so as to swing the locking elements to unlocked position.

As shown in FIGS. 1 to 3, and as more fully described in U.S. Pat. No. 4,489,850, the hyperbaric chamber 120 includes a vessel 121 having an opening in one end and a door 122 constructed in accordance with the present invention, and adapted to be locked in and unlocked from positions closing the opening by means of locking elements LE.

The vessel includes a cylinder 124 having an end wall 125 (FIG. 3) which is held against the right end of the cylinder by means of elongate rods 127 extending between the end walls. As also shown in FIG. 3, the wall 125 has a cylindrical opening 130 therethrough as well as an annular groove 128 on its inner side to receive the end of the cylinder 124.

The vessel 121 also comprises an annular body 131 which is held against the outer side of the end wall 125 by means of bolts 132 which extend through holes in the end wall 125 as well as the body 130 and are threaded at their inner ends to sockets formed in the ends of the rods 127. Thus, the bolts serve to not only hold the vessel body against the end wall 125 but also the end wall against the ends of the cylinder 124.

The end wall 125 has a groove formed therein to receive an O-ring 133 for sealably engaging the left end of the annular body 131 when the two are brought into engagement with one another, and the bolt holes in the body are aligned with one another by means of an outwardly extending flange 134 on the end wall which fits within a recess 135 in the inner end of the body 131. The body 131 further has an opening 136 therethrough forming a continuation of the opening 130 in the end wall as well as a recessed area to receive a resilient seal ring 138. The seal ring in turn has an outwardly projecting lip on its inner side for engagement by the inner side of the body of the door 122 to sealably close the opening in the end of the vessel, as will be described to follow.

The door includes a body 141 in which a window 142 may be carried and on which an outer surface 143 on its inner side is formed to engage the seal ring 138 to form a seal therewith, when the locking elements are in locked position.

The door includes another annular body 144 which is secured to the outer side of the body 141 by means of bolts 145 extending through holes in the body 144 and into threaded sockets in the outer side of the body 141. More particularly, the bodies 141 and 144 are held in spaced relation to one another by means of spacer rings 146 which surround the bolts, thereby forming an annular space in which the locking elements LE are received. An annular groove 150 is formed in the opening through the counterbore in the body 131 opposite the outer end of the annular space between the bodies 141 and 144, and thus in a position to receive the outer ends of the locking elements in their locked positions.

The locking elements are carried by the body 141 intermediate the bolts 145 by means of pins 151 (see FIG. 3) for pivoting within the annular space between locking positions, as shown in FIGS. 1 and 3, in which the outer ends of the locking elements are received in the groove 150, and unlocked positions, in which, as shown in FIG. 2, the outer ends of the locking elements are removed from the groove 150 so as to permit the door to be moved into and out of its position to close the opening in the vessel.

When the outer ends of the locking elements are in the locking position, the right-hand sides thereof are held against a bearing surface 171 on the right side of the groove 150 due to the higher pressure within the vessel, with the outer ends of the locking elements moving closely past the outer end of the cylindrical groove surface. On the other hand, when the locking elements are moved to their unlocking positions, their outer ends are removed from within the groove 150 so as to permit the door to be moved into our out of its closing position.

Figure 4:
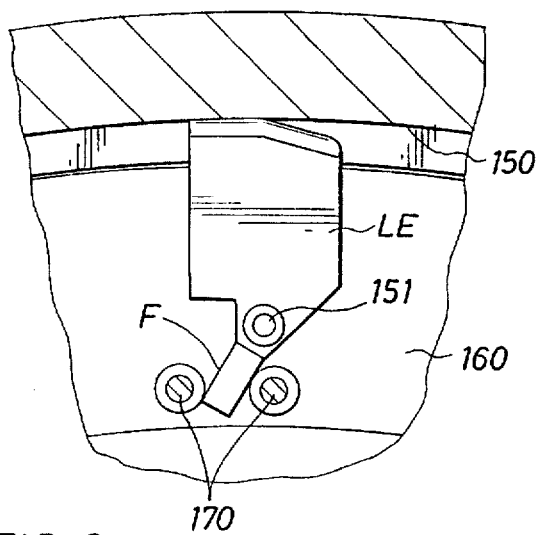
FIG. 4 is an enlarged detailed view of one of the locking elements in the locked position of FIG. 1 and with its opposite sides engaged by a pair of pins to locate it in locked position.
Figure 5:
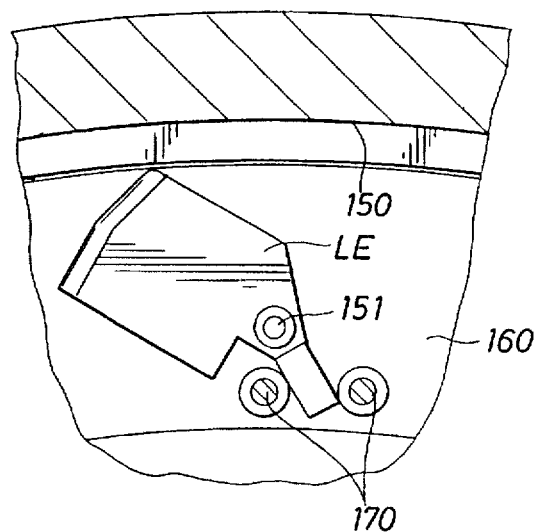
FIG. 5 is a view similar to FIG. 4 but wherein the ring has been rotated in a clockwise direction so as to swing the locking element to unlocked position.

As indicated, each locking element LE shown in FIGS. 4 and 5 has a finger E on its end which extends between a pair of pins 170 mounted on a ring 160 about which actuating ring 144 is rotatably mounted. The inner side of the ring 160 is generally aligned with the inner side of the ring 144 to form the outer side of the annular space in which the locking elements are received opposite a recessed right side of the body 144.

Thus, as shown in FIG. 3, the ring 160 has an annular groove about it to receive axial bearings 162 carried on the inner side of the ring 144 as well as a recess 163 in the outer corner thereof adjacent its left side to accommodate radial bearing 164 carried thereby for engaging the inner cylindrical surface of the actuating ring 144 of the vessel. The activating ring 144 is manually manipulatable from the opposite side of the chamber for rotation to move the locking elements between locking and unlocking positions.

Pins 170 carried on the inner side of the rotating ring 144 are arranged in pairs with one of each pair on each side of the finger of a locking element. As shown, the inner ends of the pins have threaded studs 170A which are received in sockets in the inner side of the actuating ring. Consequently, the pins are movable with the rotating ring between positions to cause the inner sides of at least one pair to engage opposite sides of the finger of the locking elements to move the locking elements between the locked position of FIG. 4 and the unlocked position of FIG. 5. Then, when the locking elements reach their locking or unlocking positions, the fingers are held from further movement in that direction by engagement between the pins of one pair.

Figure 6:
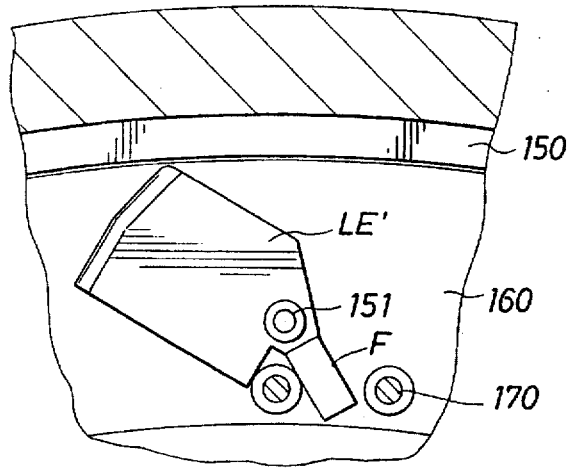
FIG. 6 is a detailed view of an alternative form of the locking element and pins with the locking element located in releasing position by a shoulder of the locking element adjacent one side thereof.

The locking elements may be of alternative construction, as shown at LE' in FIG. 6, wherein a shoulder 78 thereon is so located relative to the right side of the finger 76 as to engage the right-hand pin 46 to prevent movement of the locking elements beyond unlocking position, prior to engagement of the left side of the finger with the left hand pin. Upon rotation of the ring and locking element in a counter-clockwise direction, the left hand pin engages the left side of the finger F' as in the embodiment of FIG. 7.

In furtherance of the objects of this invention, the angled configuration of the outer ends of the locking elements permits them to be as close as possible to the inner limit of the bearing surface, and the radial extent of the area of the locking elements slidably engagable with the bearing surface against which it is urged by pressure in the chamber is relatively small as compared with their overall radial extent. At the same time, the pins 151 on which the locking elements pivot are located near the fingers on their outer ends to maximize the length of the arm over which a moment is applied by the rotating actuating ring. Additionally, the fingers are disposed in substantially equal angular relation to a radial plane through the pivot pins, in the locked and unlocked position, so as to maximize the force applied by the pins in both directions. Obviously, however, these relationships may vary depending on the rotation desired.

Figure 7:
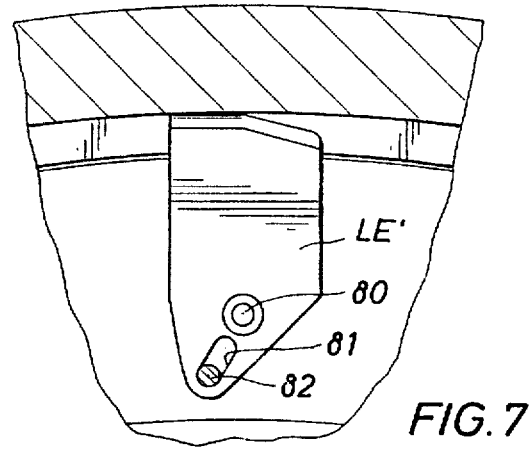
FIG. 7 is a detailed view of the alternative embodiment of the locking elements wherein each is pivotally mounted on the actuating ring of the door and has a slot to receive a pin on the ring.

FIG. 7 shows a still further embodiment of the invention, wherein a plurality of locking elements LE' is pivotally mounted in spaced-apart relation on the body 35 of the vessel by means of pins 80, and has a slot 81 in which a pin 82 mounted on the actuating ring 44 is guidably slidable. Thus, as the ring is rotated in opposite directions, the opposite sides of pin 82 bear on opposite sides of the slot to cause the element to swing between locking and unlocking positions. The engagement of one or more of the pins 80 with the outer end of the slot in which it is received may determine the maximum extent of rotation of the element.

As shown, the pins 82 are located near the outer ends of the locking elements, and the locking elements are adapted to form essentially equal angles on opposite sides of a radial plane, when in their locked and unlocked positions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

As in the case of the first embodiment, the locking elements may be of the alternative shape shown in FIG. 15, wherein they are prevented from moving beyond unlocking position by engagement of a shoulder thereon with the left-hand pin when that pin has swung the locking element to unlocked position.

What is claimed is:

1. A pressure chamber, comprising:

a pressure vessel having an opening with an inner surface and an adjacent inwardly facing bearing surface thereabout, a door having an outer surface adapted to fit within the inner surface of the opening of the vessel, means for releasably locking the door in closed position when so fitted, including locking elements each mounted on the door for pivoting between locked position in which one side of each is opposite the bearing surface on the vessel, and thus held thereagainst by pressure in the vessel, and unlocked position removed from opposite said bearing surface so as to permit the door to be installed and/or removed from within the inner surface of the vessel, a ring rotatably mounted on the door for moving the locking elements between locked and unlocked positions in response to rotation of the ring in opposite directions, and means manipulatable from the outside of the vessel for so rotating the ring.

2. As in claim 1, wherein said rotating means comprises pins mounted on the door and so arranged with respect to oppositely facing surfaces of the locking elements as to swing the locking elements into locked position, as the ring is rotated in one direction, and into unlocked position, as the ring is rotated in the other direction.

3. As in claim 2, wherein said pins are arranged in pairs on opposite sides of a locking element so that one pin of at least one pair engages one side of a locking element to swing it into locked position, as the ring is rotated in one direction, and the other pin engages the other side of the locking element to swing it into unlocked position, as the ring is rotated in the other direction.

4. As in claim 3, wherein the pins of said one pair are tightly engaged with opposite sides of the locking element in each of its locked and unlocked positions to prevent movement of the locking elements therepast.

5. As in claim 3, wherein one side of one pin of said one pair is tightly engaged with one side of the locking element in one of its locked and unlocked positions to prevent movement of the locking elements therepast, and each locking element has a shoulder adjacent its other side which is tightly engaged by the other pin, in the other of its positions, to prevent the locking elements from moving therepast.

6. As in claim 2, wherein each locking element has a slot in which a pin is received for guidably sliding therein in order to swing the locking element into locked position, as the ring is rotated in one direction, and swing the locking element into unlocked position, as the ring is rotated in the other direction.

7. As in claim 1, wherein the vessel has a cylindrical surface adjacent its bearing surface, and each locking element has an end which is contoured to move past and then closely adjacent to the cylindrical surface as the locking element moves into locking position.

* * * * *